United States Patent [19]

Nakagawa et al.

[11] 4,051,493
[45] Sept. 27, 1977

[54] FLASH PHOTOGRAPHING DEVICE

[75] Inventors: Sadao Nakagawa, Yokohama; Masaaki Tsukamoto; Toshio Dobashi, both of Kawasaki, all of Japan

[73] Assignee: Nippon Kogaku K.K., Tokyo, Japan

[21] Appl. No.: 649,636

[22] Filed: Jan. 16, 1976

[30] Foreign Application Priority Data

Jan. 23, 1975 Japan .................................. 50-10086

[51] Int. Cl.² .............................................. G03B 15/03
[52] U.S. Cl. .................................... 354/126; 354/293; 362/3
[58] Field of Search .................... 240/1.3, 73 R, 73 D, 240/81 BC, 81 BE, 81 BD; 354/293, 81, 126; 352/242

[56] References Cited

U.S. PATENT DOCUMENTS

| 1,895,706 | 1/1933 | Dorris | 240/81 BS |
| 2,599,269 | 6/1952 | Markle | 354/126 X |
| 2,697,776 | 12/1954 | Wale | 240/81 BE X |
| 3,749,900 | 7/1973 | Jonas et al. | 240/1.3 |
| 3,893,145 | 7/1975 | King | 354/293 |

FOREIGN PATENT DOCUMENTS 420,855   3/1967   Switzerland .................. 354/293

Primary Examiner—Edna M. O'Connor
Attorney, Agent, or Firm—Fitzpatrick, Cella, Harper & Scinto

[57] ABSTRACT

In a flash photographing device which comprises a camera body and a flash gun adapted to be connected to the camera body during photography, there is provided a rod member for supporting the flash gun, a supporting member secured to the camera body, and holder means provided on the supporting member for rotation with the rod member. The holder means is displaceable between a restraining position for holding the rod member against sliding and rotating movement and a half-restraining position for holding the rod member for at least sliding movement upon application of an extraneous force on the rod member. The device further includes adjusting means provided on the supporting member for displacing the holder means between the restraining position and the half-restraining position, and positioning means provided to restrain the holder means from rotating at a plurality of locations when the holder means has been displaced in the direction of rotation.

9 Claims, 5 Drawing Figures

FLASH PHOTOGRAPHING DEVICE

BACKGROUND OF THE INVENTION

1. Field of the Invention

This invention relates to a flash photographing device, and more particularly to a flash photographing device for underwater photography.

2. Description of the Prior Art

In underwater flash photographing, if a flash was given from just above or just sidewise of the camera as in land flash photographing, reflection and scattering of the light would be caused by floating matters existing between the lens and the object to be photographed and the light could not reach the object, with a result that the floating matters alone would be photographed. To avoid this, it would be advisable to space the flash gun as far as possible from the camera to bring it close to the object and directly illuminate the object from above or sidewise.

Thus, the flash photographing device for underwater photography according to the prior art has employed an arm for spacing the flash gun as far as possible from the camera.

More specifically, the arm attached to the end of the flash gun has been held to an arm holder supported to a bracket, by a clamp, and the length and rotation of the arm has been adjustable by loosening the clamp. Further, the arm holder itself has been rotatable to secure a great distance of the flash gun from the camera, and also to select an angle of illumination corresponding to the distance, as desired.

However, the loosening of the clamp has caused simultaneous liberation of the arm from the restraint under which the arm has been prevented from vertical movement and from rotation with the arm holder and of the arm holder itself from the restraint under which it has been prevented from rotation, due to the gravity of the arm and the balanced condition between the flash gun and the arm.

This has made individual fine adjustments very difficult to do and also led to a disadvantage in that the flash gun could strike against some obstacle due to the variation in length of the arm or rotation or pivoting of the arm.

SUMMARY OF THE INVENTION

It is the object of the present invention to eliminate the abovenoted disadvantages and to provide a flash photographing device in which mere loosening of the clamp may not result in sliding, rotating and/or pivoting movement of the arm and the arm holder.

According to the present invention, a rod member of uniform thickness is employed as the arm to impart to the arm holder a resiliency which causes the holder to restore a predetermined configuration. Grooves in which the arm may closely fit in the restored position of the arm holder are formed in the opposite side surfaces of the arm clipping portion of the holder, so that upon loosening of a clamp, the arm may be movably secured to the arm holder in intimate contact therewith by the frictional resistance between the grooves and the arm and upon tightening of the clamp, the arm may be immovably urged against the arm holder. The engaging surfaces of the arm holder and bracket are formed with mating portions for engagement with one another at a plurality of locations, and a member for normally biasing the arm holder against the bracket is provided so that upon loosening of the clamp, the arm holder may be movably urged against the bracket by the biasing member and upon tightening of the clamp, the arm holder may be immovably urged against the bracket by the clamp. When the clamp is in loosened position, an extraneous force may be exerted on the arm and the arm holder so that the sliding movement of the arm and the pivoting movement of the arm holder may be selectively effected in accordance with the direction in which the extraneous force acts.

If the arm is a round rod, the arm itself will also be rotatable, but the sliding and the rotational movement of the arm will not clearly be distinguishable from each other. Therefore, in order that the sliding and the rotational movement of the arm may be more distinguishably selected, the arm may be provided by a special form rod (the grooves will naturally be of a configuration complementary therewith) and a flash gun may be supported on the arm by a ball joint.

The invention will become more fully apparent from the following detailed description thereof taken in conjunction with the accompanying drawings.

DESCRIPTION OF THE PREFERRED EMBODIMENTS

Figure 1:
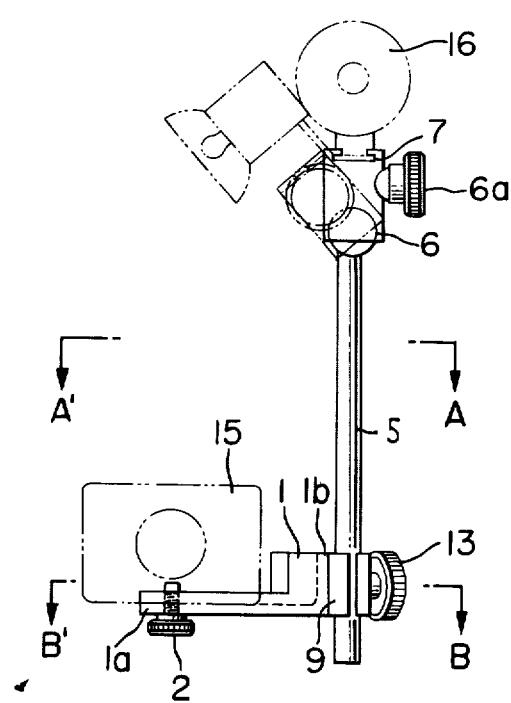
FIGS. 1 to 4 show a first embodiment of the present invention, FIGS. 1 and 4 being front views, FIG. 2 being a view taken along line A—A in FIG. 1, and FIG. 3 being a cross-sectional view taken along line B—B in FIG. 1.
Figure 2:
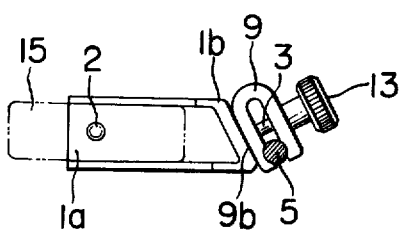
Figure 3:
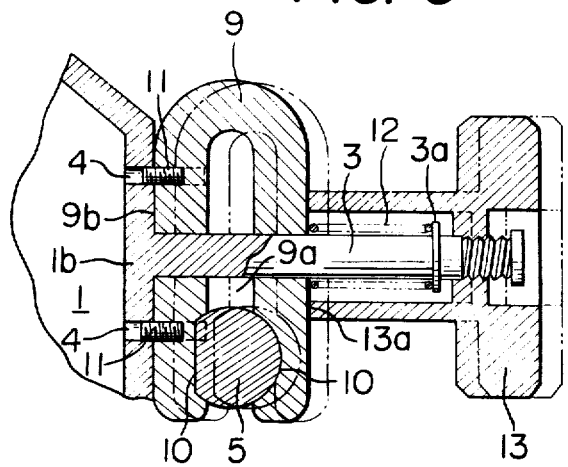

A first embodiment in which the arm is a special form rod will hereinafter be described with reference to FIGS. 1 to 4. In FIGS. 1 to 3, reference numeral 1 designates a bracket which has a bottom 1a provided with a conventional camera securing screw 2 and a side surface 1b provided with a shaft 3 (FIGS. 2 and 3). Formed circumferentially about the shaft 3 are twelve equally spaced mating holes 4 (FIG. 3).

An arm 5 is a special form rod which may be provided by cutting away a portion of a round rod of uniform thickness in the lengthwise direction thereof. A conventional ball joint 6 is provided on the top end of the arm 5. A shoe grip 7 engaged with the shoe of a flash gun 16 is provided on top of the ball joint 6.

An arm holder 9 for clipping the arm 5 is rotatably supported on the shaft 3 of the bracket 1. The arm holder 9 has a resiliency which ensures that the holder will return to a predetermined configuration, and the opposite side surfaces of the clipping portion 9a thereof are formed with grooves 10 in which the arm 5 may closely fit when the arm holder is in its restored position. Pins 11 for mating with the mating holes 4 in the bracket 1 are studded in the bracket-engaging surface 9b of the arm holder 9.

A spring 12 (FIG. 3) is received between a spring receiver 3a provided on the shaft 3 of the bracket 1 and the arm holder 9 to normally bias the arm holder 9 to one side surface 1b of the bracket. A clamp 13 is threadably received on the end portion of the shaft 3 and, as the clamp is screwed inwardly, the engaging portion 13a thereof may urge the arm holder 9 against the bracket 1.

A camera 15 may be secured to the bottom 1a of the bracket by means of a camera securing screw 2.

The solid lines in FIG. 3 show a position in which the clamp 13 is screwed inwardly to the maximum. The arm holder 9 is being urged against the side surface 1b of the bracket by the engaging portion 13a of the clamp, and the arm 5 is being tightly held between the opposite grooves 10 formed in the arm holder 9.

Thus, in this position, the relative position between the camera 15 and the flash gun 16 is invariable.

Subsequently, by turning the clamp 13 to move it axially rightwardly in FIG. 3 to assume the position as shown by phantom lines, there may be provided a clearance between the engaging portion 13a of the clamp and the arm holder 9. Thus, the arm holder 9 becomes rightwardly movable by the amount of the clearance.

Figure 4:
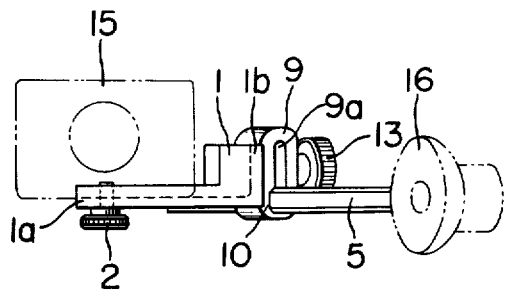

As the arm holder 9 or the arm 5 is thus shifted rightwardly in FIG. 3, the pins 11 withdraw out of the mating holes 4 to permit rotation of the arm holder 9 (the phantom-line position is assumed). FIG. 4 shows a position attained by so rotating the arm holder 9 through 90° from the position of FIG. 1 toward this side in the figure. In this position, the pins are again brought into engagement with the mating holes 4 by the biasing force of the spring 12, thus securing the arm holder 9 to bracket 1. Also, if the arm 5 is depressed with the clamp 13 in loosened position, the distance between the camera 15 and the flash gun 16 will become shorter as shown in FIG. 4. If the clamp 13 is again tightened, both the arm 5 and the arm holder 9 will be immovably securely urged against each other.

Rotation of the flash gun may be accomplished with the aid of the ball joint. By turning the knob 6a of the ball joint to loosen the joint, the flash gun 16 becomes rotatable and may then be tilted. The phantom lines in FIG. 1 show the position attained by rotating the flash gun through 90° toward the camera and then tilting it toward the camera.

Thus, by using the ball joint, it becomes possible to impart a finer tilt to the flash gun 16 in addition to the rough tilt thereof by the rotation of the arm holder 9.

Figure 5:
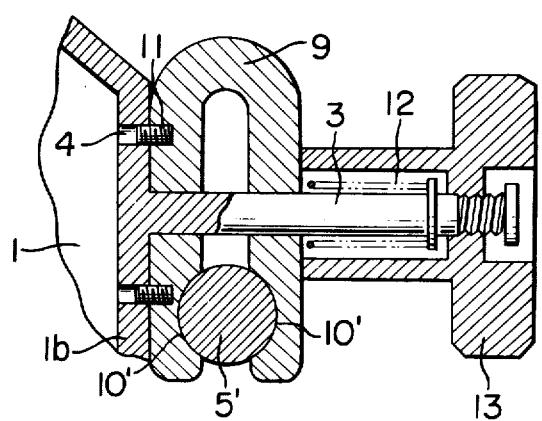
FIG. 5 is a view similar to FIG. 3 but showing a second embodiment of the present invention.

FIG. 5 shows a second embodiment in which the special form rod of the first embodiment is replaced by a round rod.

In this embodiment, the arm 5' may readily be made rotatable by loosening the clamp 13 since it is secured by simple frictional resistance. This in turn permits the flash gun to be directly attached to the arm without the use of a ball joint.

It will be apparent that the flash gun is not restricted to the detachable type as in the first and the second embodiment but may also be of the fixed type.

According to the present invention, as has hitherto been described, even if the clamp is loosened, there occurs no such sliding, rotating and/or pivoting movement of the arm and the arm holder as would cause the device itself, especially, the flash gun to strike against some obstacle to induce destruction thereof.

Further, the sliding, rotating and pivoting movements described above must be effected by loosening the clamp and thereafter imparting different forces to the individual members, and this means adjustability of the individual members and operability of the device.

We claim:

1. A flash photographing device adapted to be attached to a camera body and a flash gun for illuminating an object to be photographed, said device comprising:
   a. a rod member for supporting said flash gun;
   b. a supporting member secured to said camera body;
   c. holder means displaceable between a restraining position in which said holder means holds said rod member against sliding and rotating movement and a half-restraining position in which said holder means holds said rod member for at least sliding movement upon application of an extraneous force on said rod member, said holder means being rotatable about said supporting member;
   d. adjusting means provided on said supporting member for displacing said holder means between said restraining position and said half-restraining position; and
   e. restraining means provided to restrain said holder means from rotating when said holder means is in said restraining position and to release the restraint when said holder means is in said half-restraining position.

2. A flash photographing device as defined in claim 1, wherein said holder means comprises a resilient U-shaped holding member having a clipping portion for clipping said rod member.

3. A flash photographing device as defined in claim 2, wherein said adjusting means comprises an urging member provided between said supporting member and said holding member to exert a force on said holding member to bring same into said restraining position and to release same from said restraining position and allow same to move into said half-restraining position.

4. A flash photographing device as defined in claim 3, wherein said restraining means includes mutually engageable portions provided respectively on said holding member and said supporting member.

5. A flash photographing device as defined in claim 4, wherein said holding member is rotatable about the longitudinal axis of said supporting member and is displaceable along said axis between a first position in which said engageable portions are engaged with each other and a second position in which said engageable portions are disengaged.

6. A flash photographing device as defined in claim 5, further comprising bias means for normally biasing said holding member toward said first position.

7. A flash photographing device as defined in claim 6, wherein said rod member is of non-circular cross-section so that it is unrotatable even when said holding member is in said half-restraining position.

8. A flash photographing device as defined in claim 7, wherein said urging member is a clamp member threadably engaged with said support member.

9. A flash photographing device as defined in claim 1, wherein said holding member holds said rod member so that the latter is perpendicular to the longitudinal axis of the supporting member.

* * * * *